US009740660B2

(12) United States Patent
Wei et al.

(10) Patent No.: US 9,740,660 B2
(45) Date of Patent: Aug. 22, 2017

(54) CPU CONTROL METHOD, ELECTRONIC SYSTEM CONTROL METHOD AND ELECTRONIC SYSTEM FOR IMPROVED CPU UTILIZATION IN EXECUTING FUNCTIONS

(71) Applicant: MEDIATEK INC., Hsin-Chu (TW)

(72) Inventors: Chun-Hang Wei, Yilan County (TW); Hung-Lin Chou, Hsinchu County (TW); Nicholas Ching Hui Tang, Hsinchu County (TW); Jia-Ming Chen, Hsinchu County (TW); Ya-Ting Chang, Hsinchu (TW); Fan-Lei Liao, Taichung (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/890,427

(22) PCT Filed: Apr. 24, 2015

(86) PCT No.: PCT/CN2015/077380
§ 371 (c)(1),
(2) Date: Nov. 11, 2015

(87) PCT Pub. No.: WO2015/161826
PCT Pub. Date: Oct. 29, 2015

(65) Prior Publication Data
US 2016/0179747 A1 Jun. 23, 2016

Related U.S. Application Data

(60) Provisional application No. 61/983,601, filed on Apr. 24, 2014, provisional application No. 61/984,959, filed on Apr. 28, 2014.

(51) Int. Cl.
*G06F 9/50* (2006.01)
*G06F 15/82* (2006.01)
*G06F 9/30* (2006.01)

(52) U.S. Cl.
CPC .......... *G06F 15/82* (2013.01); *G06F 9/30098* (2013.01); *G06F 9/5055* (2013.01); *G06F 9/5066* (2013.01)

(58) Field of Classification Search
CPC .................................................... G06F 9/5066
See application file for complete search history.

(56) References Cited

U.S. PATENT DOCUMENTS 5,845,094 A * 12/1998 Beauchamp ............ H04L 41/26
709/220
8,661,226 B2   2/2014 Garland
(Continued)

FOREIGN PATENT DOCUMENTS

| CN | 101436121 A | 5/2009 |
| CN | 101556534 A | 10/2009 |
| CN | 101630273 A | 1/2010 |

OTHER PUBLICATIONS

ARM, Cortex-M4 Devices Generic User Guide, ARM, 2010.*
(Continued)

*Primary Examiner* — Charlie Sun
(74) *Attorney, Agent, or Firm* — Han IP Corporation; Andy M. Han

(57) ABSTRACT

A CPU control method for controlling a first CPU and a second CPU The method comprises: (a) applying the first CPU to execute a first group of codes comprising at least one code if the first CPU is operating to perform a first function; and (c) applying the second CPU to execute a second group of codes comprising at least one code if the second CPU is operating to perform the first function. The first group of codes is optimized for the first CPU, the second group of (Continued)

codes is optimized for the second CPU and the first group of codes comprises at least one code different from the code for the second group of codes.

12 Claims, 5 Drawing Sheets

(56) References Cited

U.S. PATENT DOCUMENTS

| | | | |
|---|---|---|---|
| 9,280,395 B2* | 3/2016 | Jiang | G06F 8/52 |
| 2010/0077472 A1 | 3/2010 | Kaabouch | |
| 2014/0181830 A1* | 6/2014 | Naik | G06F 9/461 |
| | | | 718/104 |
| 2015/0121048 A1* | 4/2015 | Lukefahr | G06F 9/30189 |
| | | | 712/229 |
| 2016/0019130 A1* | 1/2016 | Kruglick | G06F 9/5044 |
| | | | 714/11 |

OTHER PUBLICATIONS

"International Search Report" mailed on Jul. 1, 2015 for International application No. PCT/CN2015/077380, International filing date:Apr. 24, 2015.

* cited by examiner

CPU CONTROL METHOD, ELECTRONIC SYSTEM CONTROL METHOD AND ELECTRONIC SYSTEM FOR IMPROVED CPU UTILIZATION IN EXECUTING FUNCTIONS

CROSS REFERENCE TO RELATED APPLICATIONS

This application claims the benefit of U.S. Provisional Application No. 61/983,601, filed on Apr. 24, 2014, and U.S. Provisional Application No. 61/984,959, filed on Apr. 28, 2014, the contents of which are incorporated herein by reference.

TECHNICAL FIELD

The present invention relates to a CPU control method, an electronic system control method and an electronic system comprising applying the methods, and particularly relates to a CPU control method, an electronic system control method and an electronic system which can optimize different CPUS.

BACKGROUND

Some electronic systems may comprise more than one CPU (central processing unit) to meet different requirements. For example, one CPU provides more functions and another CPU save more energy while operating. For those electronic systems, the CPUs execute the same codes while performing the same function.

However, one CPU may have better performance while executing some specific combination of codes. If all CPUs execute the same codes while performing the same function, the CPU may not have optimized performance.

SUMMARY

One objective of the present invention is to provide a CPU control method to control two CPUs to execute different codes even if the two CPUs perform the same function.

One objective of the present invention is to provide an electronic system control method to control two CPUs to execute different codes even if the two CPUs perform the same sub-function.

One objective of the present invention is to provide an electronic system comprising two CPUs capable of executing different codes even if the two CPUs perform the same function.

One embodiment of the present invention discloses a CPU control method for controlling a first CPU and a second CPU. The method comprises: (a) applying the first CPU to execute a first group of codes comprising at least one code if the first CPU is operating to perform a first function; and (b) applying the second CPU to execute a second group of codes comprising at least one code if the second CPU is operating to perform the first function. The first group of codes is optimized for the first CPU, the second group of codes is optimized for the second CPU and the first group of codes comprises at least one code different from the code for the second group of codes Another embodiment of the present invention discloses an electronic system control method, for controlling an electronic system comprising a first CPU and a second CPU. The electronic system control method comprises: (a) controlling the electronic system to perform a main function comprising at least one sub-function; and (b) performing following step while the electronic system performing the sub-function: (b1) applying the first CPU to execute a first group of codes comprising at least one code if the step (b1) determines the first CPU is operating to perform a first function; and (b2) applying the second CPU to execute a second group of codes comprising at least one code if the step (b1) determines the second CPU is operating to perform the first function. The first group of codes is optimized for the first CPU, the second group of codes is optimized for the second CPU and the first group of codes comprises at least one code different from the code for the second group of codes Still another embodiment of the present invention discloses an electronic system, which comprises: a first CPU; a second CPU. If the first CPU operates to perform a first function, the first CPU executes a first group of codes. If the second CPU operates to perform the first function, the second CPU executes a second group of codes.

Another embodiment of the present invention discloses an electronic system configured to perform a main function comprising at least one sub-function. The electronic system comprises: a first CPU, configured to execute a first group of codes comprising at least one code if the first CPU perform a first sub-function included in the main function; and a second CPU, configured to execute a second group of codes comprising at least one code if the second CPU perform the first sub-function. The first group of codes comprises at least one code different from codes for the second group of codes.

In view of above-mentioned embodiments, different CPUs can execute different codes even if the CPUs perform the same function or the same sub-function, thus the performance of the CPUs can be optimized.

These and other objectives of the present invention will no doubt become obvious to those of ordinary skill in the art after reading the following detailed description of the preferred embodiment that is illustrated in the various figures and drawings.

DETAILED DESCRIPTION

Many embodiments are provided as examples to explain the concept of the present invention. Please note the following embodiments are applied to two CPUs (first and second). However, the present invention can be applied to more than two CPUs.

Figure 1:
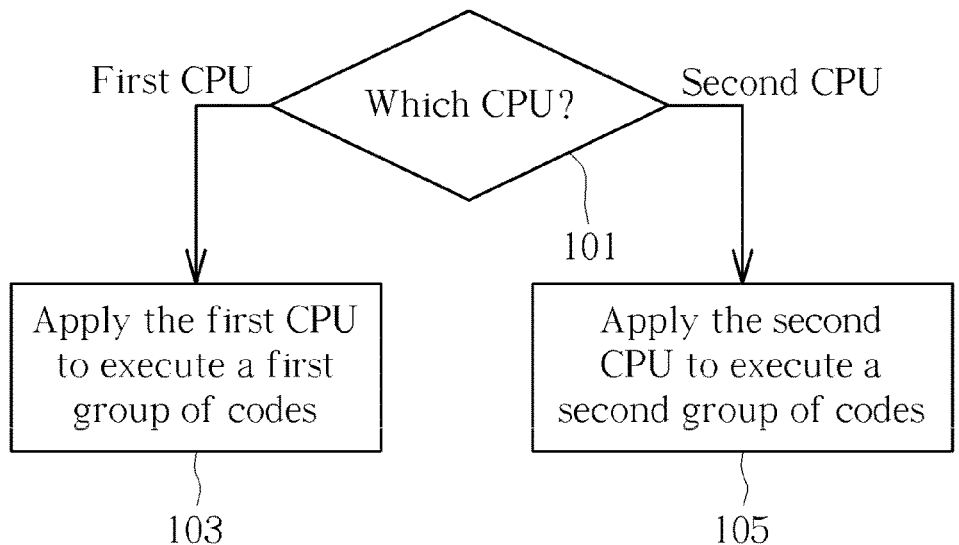
FIG. 1 is a flow chart illustrating a CPU control method according to one embodiment of the present invention.

FIG. 1 is a flow chart illustrating a CPU control method according to one embodiment of the present invention. FIG. 1 comprises the followings steps:

Step 101

If the first CPU is operating to perform the first function, go to step 103. Also, if the second CPU is operating to perform the first function, go to step 105.

Please note the first function here means the steps 103 and 105 perform the same function, and does not mean that the steps 103 and 105 are performed only for some specific functions.

In one embodiment, the step of determining which one of the first CPU and the second CPU is operating is performed before the step 101.

Step 103

Apply the first CPU to execute a first group of codes comprising at least one code if the step 101 determines the first CPU is operating.

Step 105

Apply the second CPU to execute a second group of codes comprising at least one code if the step 101 determines the second CPU is operating.

The first group of codes comprises at least one code different from the codes in the second group of codes.

Many methods can be applied to decide the timing for performing the method depicted in FIG. 1. For example, at least one check point can be set in the programs and the method depicted in FIG. 1 can be performed at the check point.

The first CPU and the second CPU can be various kinds of combinations. For example, the first CPU and the second CPU apply ARM® big.LITTLE™ architecture. In such example, the first CPU is a big core CPU such as CA57 or CA17 and the second CPU is a little core CPU such as CA53 or CA7. In one embodiment, the first CPU and the second CPU have different power consumption. In another embodiment, the first CPU and the second CPU operate at different operating frequencies. In still another embodiment, the first CPU can perform more functions than the second CPU (i.e. the first CPU is more powerful than the second CPU).

Many methods can be applied to determine which one of the first CPU and the second CPU is operating. In one embodiment, the first CPU and the second CPU apply above-mentioned ARM® big.LITTLE™ architecture, the information for which one of the first CPU and the second CPU is operating (i.e. the CPU information) can be acquired via reading a register.

Figure 2:
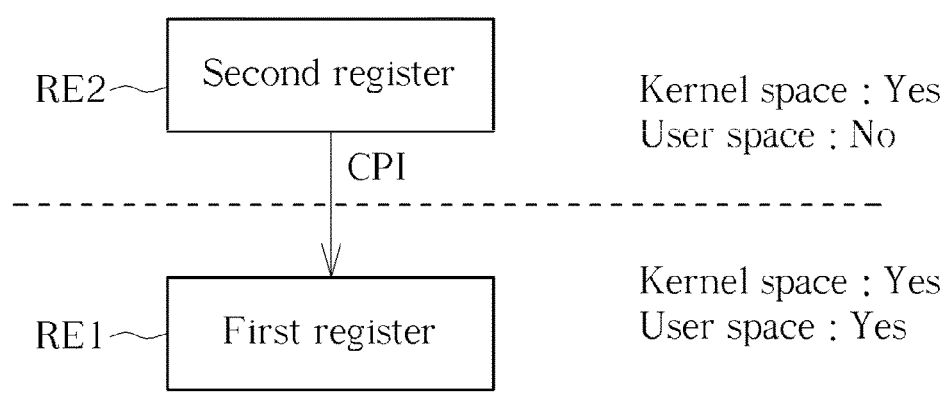
FIG. 2 is a schematic diagram illustrating an example of acquiring CPU information.

FIG. 2 is a schematic diagram illustrating an example of acquiring CPU information. As depicted in FIG. 2, the CPU information CPI is originally stored in a second register RE2 before the step 101 of FIG. 1. The second register RE2 can be read in the kernel space but cannot be read in the user space. In the kernel space, the CPU information CPI is read from the second register RE2 and stored to the first register RE1 before the step 101 of FIG. 1. The first register RE1 can be read in both the kernel space and the user space. Afterward, in the user space, the step 101 of FIG. 1 reads the CPU information CPI from the first register RE1 and determines which CPU is operating based on the CPU information CPI. Please note, the steps depicted in FIG. 2 are not limited to be applied to CPUs applying above-mentioned ARM® big.LITTLE™ architecture.

Figure 3:
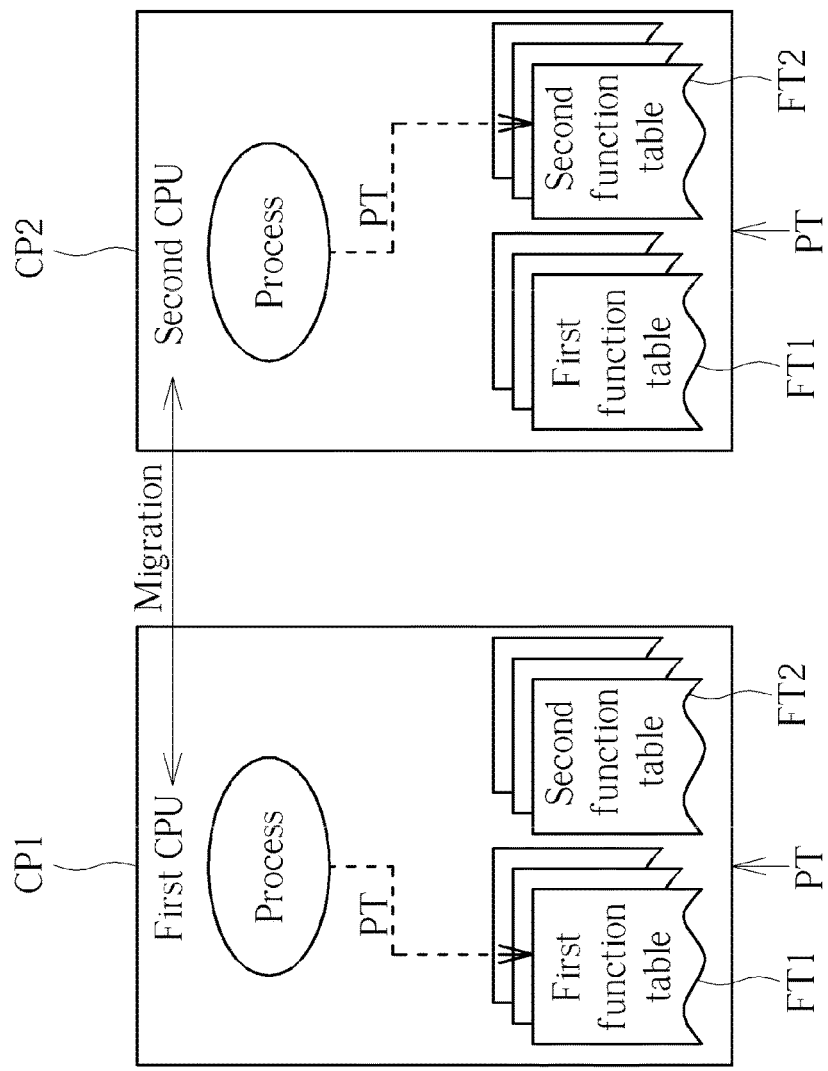
FIG. 3 is a schematic diagram illustrating the first CPU or the second CPU to execute different codes according to another embodiment of the present invention.

FIG. 3 is a schematic diagram illustrating how the first CPU or the second CPU execute different codes according to another embodiment of the present invention. As stated in FIG. 3, if the process is migrated from the first CPU CP1 to the second CPU CP2, the second CPU CP2 receives pointer PT, which points to a second function table FT2. The pointer PT can be regarded as code indicating information. The second function table FT2 may comprise the second group of codes. By this way, the second CPU CP2 can read the second group of codes from the second function table FT2. On the contrary, if the process is migrated from the second CPU CP2 to the first CPU CP1, the first CPU CP1 receives pointer PT which points to a first function table FT1. The first function table FT1 may comprise the first group of codes. By this way, the first CPU CP1 can read the first group of codes from the first function table FT1. In one embodiment, both the first function table FT1 and the second function table FT2 comprises more than one group of codes which respectively corresponds to different functions.

Figure 4:
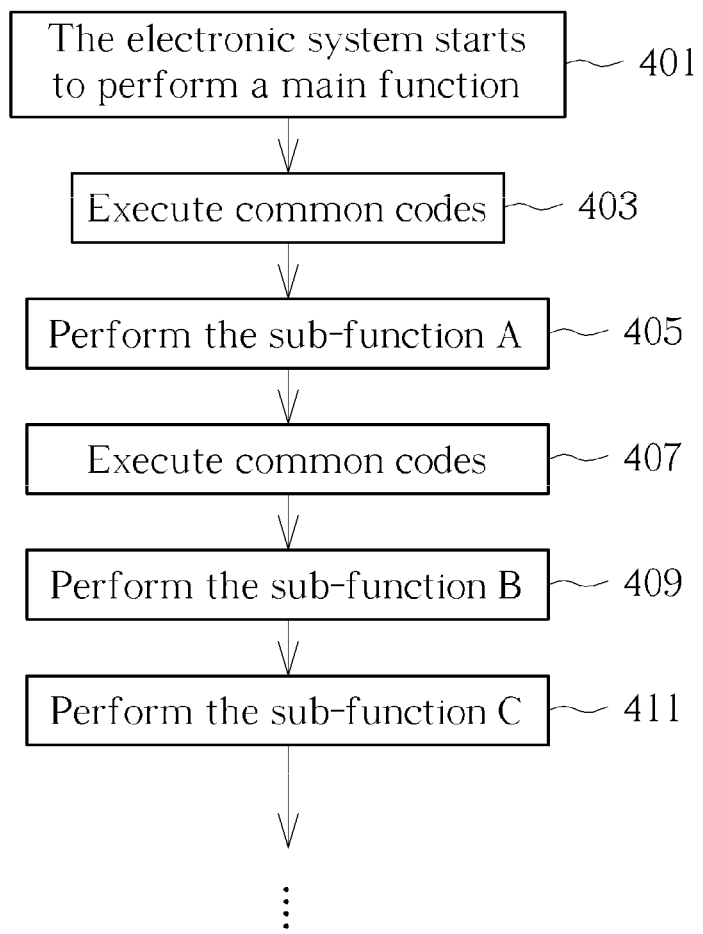
FIG. 4 and FIG. 5 are flow charts illustrating a method for controlling the first CPU and the second CPU in an electronic system to execute different codes, according to another embodiment of the present invention.
Figure 5:
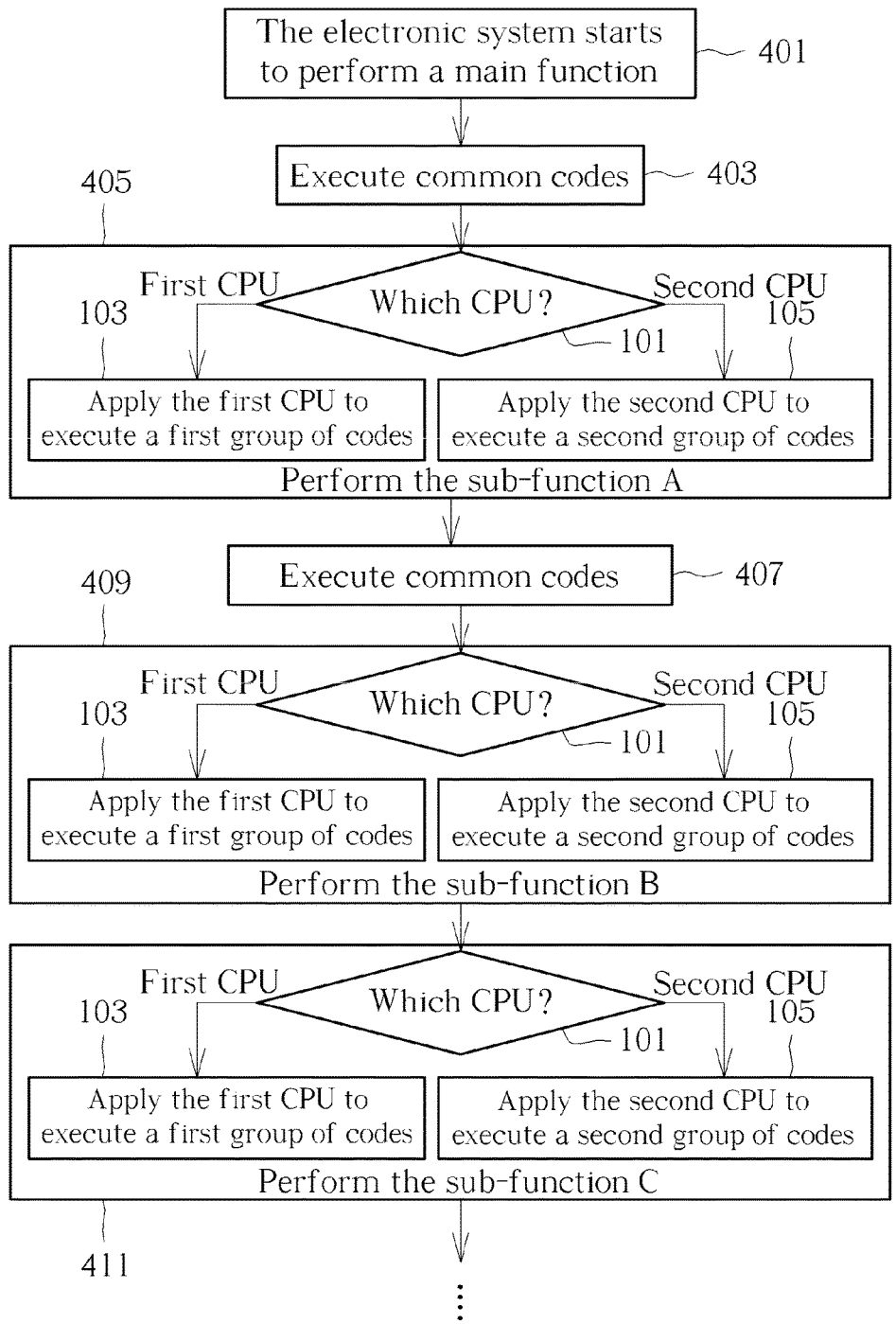

FIG. 4 and FIG. 5 are flow charts illustrating a method for controlling the first CPU and the second CPU in an electronic system to execute different codes, according to another embodiment of the present invention. In these embodiments, the CPUs are optimized for at least one sub-function rather than the whole function.

The embodiment in FIG. 4 comprises the following steps:

Step 401

The electronic system starts to perform a main function. The main function may comprise a plurality of sub-functions. For example, a main function "displaying a movie" may comprise sub-functions of "displaying the audio data" and "playing the voice data". In other words, the main function corresponds to a main program comprising at least one sub program corresponding to at least one sub function. In this embodiment, the main function comprises three sub-functions "sub-function A", "sub-function B", and "sub-function C".

Step 403

Execute common codes. That is, in such step either the first CPU or the second CPU executes the same code while it is operating.

Step 405

Perform the sub-function A.

Step 407

Execute common codes.

Step 409

Perform the sub-function B.

Step 411

Perform the sub-function C.

In one embodiment, the method illustrated in FIG. 1 is performed if the sub-function A, sub-function B, and sub-function C starts. As illustrated in FIG. 5, the steps 405, 409 and 411 all comprises the steps 101, 103, 105 shown in FIG. 1

Figure 6:
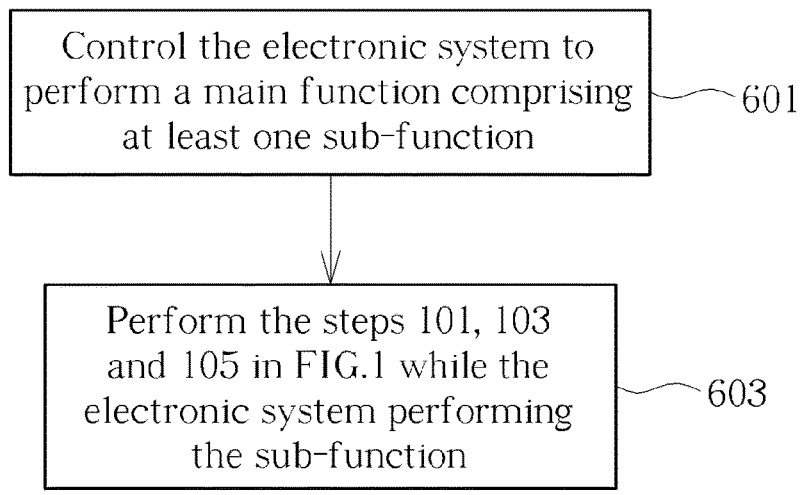
FIG. 6 is a flow chart illustrating an electronic system control method according to one embodiment of the present invention.

Please note, in the embodiments depicted in FIG. 4 and FIG. 5, the number for the sub-functions is not limited to 3, and the step of executing common codes can be neglected. Accordingly, the embodiments depicted in FIG. 4 and FIG. 5 can be summarized as an electronic control system control method shown in FIG. 6, which comprises the steps of:

Step 601

Control the electronic system to perform a main function comprising at least one sub-function.

Step 603

Perform the steps 101, 103 and 105 in FIG. 1 while the electronic system performing the sub-function.

Figure 7:
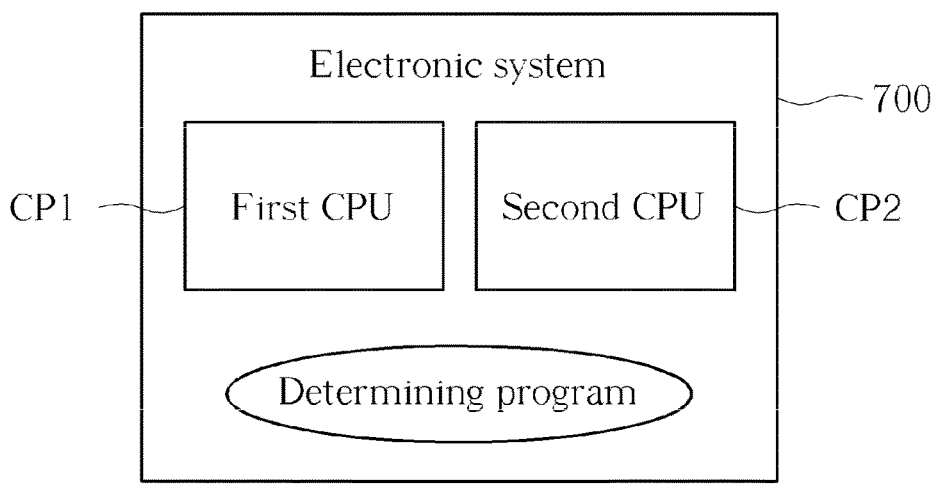
FIG. 7 is a block diagram illustrating an electronic system according to one embodiment of the present invention.

FIG. 7 is a block diagram illustrating an electronic system according to one embodiment of the present invention. As shown in FIG. 7, the electronic system 700 comprises a first CPU CP1 and a second CPU CP2. A determining program can be executed to determine which one of the CPU is operating. The determining program can be executed by the first CPU CP1 or the second CPU CP2, or a circuit independent from the first CPU CP1 and the second CPU CP2. In such case, the first CPU, the second CPU or the circuit independent from the first CPU CP1 and the second CPU CP2 can be regarded as a "determining means". Such determining means also performs the steps 101 and 103 in FIG. 1.

Other detail operations for the electronic system 700 have been depicted in abovementioned embodiments, thus not illustrated here.

In view of above-mentioned embodiments, different CPUs can execute different codes, thus the performance of the CPUs can be optimized.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A central processing unit (CPU) control method, for controlling different CPUs including a first CPU and a second CPU, comprising:
a series of operations to optimize the different CPUs by:
acquiring CPU information from a second register which is accessible in a kernel space but not in a user space;
storing the CPU information in a first register in the kernel space, the first register accessible in the kernel space and the user space;
after the storing is complete, reading the CPU information from the first register in the user space;
in response to the reading, determining which one of the first CPU and the second CPU is operating to perform a first function according to the CPU information stored in the first register;
based on the determining:
applying the first CPU to execute a first group of codes comprising at least one code if the first CPU is operating to perform the first function; and
applying the second CPU to execute a second group of codes comprising at least one code if the second CPU is operating to perform the first function,
wherein the first group of codes is optimized for the first CPU, the second group of codes is optimized for the second CPU and the first group of codes comprises at least one code different from codes in the second group of codes.

2. The CPU control method of claim 1, further comprising:
detecting migration between the first CPU and the second CPU;
changing a code indicating information when CPU migration is detected; and
reading a specific group of codes according to the code indicating information.

3. The CPU control method of claim 1, further comprising:
setting at least one check point; and
determining which one of the first CPU and the second CPU is operating at the check point.

4. An electronic system control method, for controlling an electronic system comprising:
subsystems configured to optimize different central processing units (CPUs), the subsystems includes:
a first central processing unit (CPU) and a second CPU, comprising:
controlling the electronic system to perform a main function comprising at least one sub-function; and
performing following steps while the electronic system performing the sub-function:
acquiring CPU information from a second register which is accessible in a kernel space but not in a user space;
storing the CPU information in a first register in the kernel space, the first register accessible in the kernel space and the user space;
after the storing is complete, reading the CPU information from the first register in the user space;
in response to the reading, determining which one of the first CPU and the second CPU is operating to perform the sub-function according to the CPU information stored in the first register;
based on the determining:
applying the first CPU to execute a first group of codes comprising at least one code if it is determined that the first CPU is operating to perform the sub-function; and
applying the second CPU to execute a second group of codes comprising at least one code if it is determined that the second CPU is operating to perform the sub-function, wherein the first group of codes is optimized for the first CPU, the second group of codes is optimized for the second CPU and the first group of codes comprises at least one code different from codes in the second group of codes.

5. The electronic system control method of claim 4, further comprising:
detecting migration between the first CPU and the second CPU;
changing a code indicating information when CPU migration is detected; and
reading a specific group of codes according to the code indicating information.

6. The electronic system control method of claim 4, further comprising:
setting at least one check point; and
determining which one of the first CPU and the second CPU is operating at the check point.

7. An electronic system, comprising:
subsystems configured to optimize different central processing units (CPUs), the subsystems includes:
a first central processing unit (CPU);
a second CPU; and
a determiner configured to execute a determining program to determine which one of the first CPU and the second CPU is operating to perform a first function, wherein:
the determiner acquires CPU information from a second register, which is accessible in a kernel space but not in a user space, and stores the CPU information to a first register in the kernel space;
after the storing is complete, the determiner reads the CPU information from the first register in the user space;
in response to the reading, the determiner performs the determining according to the CPU information stored in the first register which is accessible in the kernel space and the user space;
based on the determining:
if the first CPU operates to perform the first function, the first CPU executes a first group of codes;
if the second CPU operates to perform the first function, the second CPU executes a second group of codes, wherein the first group of codes is optimized for the first CPU, the second group of codes is optimized for the second CPU, and wherein the first group of codes comprises at least one code different from codes in the second group of codes.

8. The electronic system of claim 7, wherein the first CPU reads the first group of codes and the second CPU reads the second group of codes according to code indicating information pointing to at least one function table, if a process is migrated from one of the first CPU and the second CPU to the other.

9. The electronic system of claim 7,
wherein the determiner sets at least one check point, and executes the determining program to determine which one of the first CPU and the second CPU is operating at the check point.

10. An electronic system, comprising:
subsystems configured to optimize different central processing units (CPUs), the subsystems includes:
a determiner configured to determine which one of a first CPU and a second CPU is operating to perform a first sub-function according to CPU information stored in a first register which is accessible in a kernel space and a user space,
wherein:
before determining which one of the first CPU and the second CPU is operating to perform the first sub-function:
the determiner acquires the CPU information from a second register, which is accessible in the kernel space but not in the user space, and stores the CPU information to the first register in the kernel space; and
after the storing is complete, the determiner reads the CPU information from the first register in the user space;
based on the determining:
the CPU configured to execute a first group of codes comprising at least one code if the first CPU is operating to perform the first sub-function included in a main function, wherein the first group of codes comprises at least one code different from codes in the second group of codes; and
the second CPU, configured to execute a second group of codes comprising at least one code if the second CPU is operating to perform the first sub-function.

11. The electronic system of claim 10, wherein the first CPU reads the first group of codes and the second CPU reads the second group of codes according code indicating information pointing to at least one function table, if a process is migrated from one of the first CPU and the second CPU to the other.

12. The electronic system of claim 10,
wherein the determiner is further configured to set at least one check point, and configured to determine which one of the first CPU and the second CPU is operating at the check point.

* * * * *